United States Patent
Choi (10) Patent No.: US 8,166,227 B2
(45) Date of Patent: Apr. 24, 2012

(54) APPARATUS FOR PROCESSING PERIPHERAL COMPONENT INTERCONNECT EXPRESS PROTOCOL

(75) Inventor: Yongseok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 192 days.

(21) Appl. No.: 12/783,198

(22) Filed: May 19, 2010

(65) Prior Publication Data

US 2011/0145469 A1 Jun. 16, 2011

(30) Foreign Application Priority Data

Dec. 11, 2009 (KR) .................. 10-2009-0123330

(51) Int. Cl.
*G06F 13/20* (2006.01)
(52) U.S. Cl. ...................... 710/313; 370/394
(58) Field of Classification Search .................. 710/313; 370/394

See application file for complete search history.

(56) References Cited

U.S. PATENT DOCUMENTS

| 5,815,167 A | 9/1998 | Muthal et al. |
| 2009/0086735 A1 | 4/2009 | Tsang |

FOREIGN PATENT DOCUMENTS

| KR | 1020040063454 A | 7/2004 |
| KR | 1020050100445 A | 10/2005 |

*Primary Examiner* — Clifford Knoll (57) ABSTRACT

An apparatus for processing a PCI Express protocol, includes: a PCI Express transaction layer reception unit for transmitting status information, and performing a data writing operation; a PCI Express data link layer transmission unit for creating a flow control packet, transmitting the flow control packet to a PCI Express physical layer, and transmitting an integrity acknowledgement packet to the PCI Express physical layer; and a PCI Express physical layer for transmitting the flow control packet and the integrity acknowledgement packet to an upstream device, and transmitting the writing request packet to a PCI Express data link layer reception unit. Further, the apparatus includes a PCI Express data link layer reception unit for transmitting the writing request packet to the PCI Express transaction layer reception unit, and transmitting the integrity acknowledgement packet to the PCI Express data link layer transmission unit and a PCI Express transaction layer reception unit.

20 Claims, 5 Drawing Sheets

APPARATUS FOR PROCESSING PERIPHERAL COMPONENT INTERCONNECT EXPRESS PROTOCOL

CROSS-REFERENCE TO RELATED APPLICATIONS

The present invention claims priority of Korean Patent Application No. 10-2009-0123330, filed on Dec. 11, 2009, which is incorporated herein by reference.

FIELD OF THE INVENTION

The present invention relates to an apparatus for processing a Peripheral Component Interconnect (PCI) Express protocol; and, more particularly, to an apparatus for processing a PCI Express protocol which enables the checking of integrity of a received packet, the alignment of the data of a packet to be transmitted or the retransmission of a transmitted packet to be implemented without using memory.

BACKGROUND OF THE INVENTION

A typical technology for processing a PCI Express protocol is configured to use a buffer for storing data included in a received packet to guarantee the integrity of data in a transaction layer and a data link layer, a buffer for temporarily storing the data of a packet to be transmitted because the point of time which the completion of the data is guaranteed for is unclear, and a retransmission buffer for preparing for the case where it is impossible to become aware of the arrival of a transmitted packet until the packet is checked for errors at the destination and notification of the complete arrival of the packet is provided. These buffers are constructed using memory.

Figure 1:
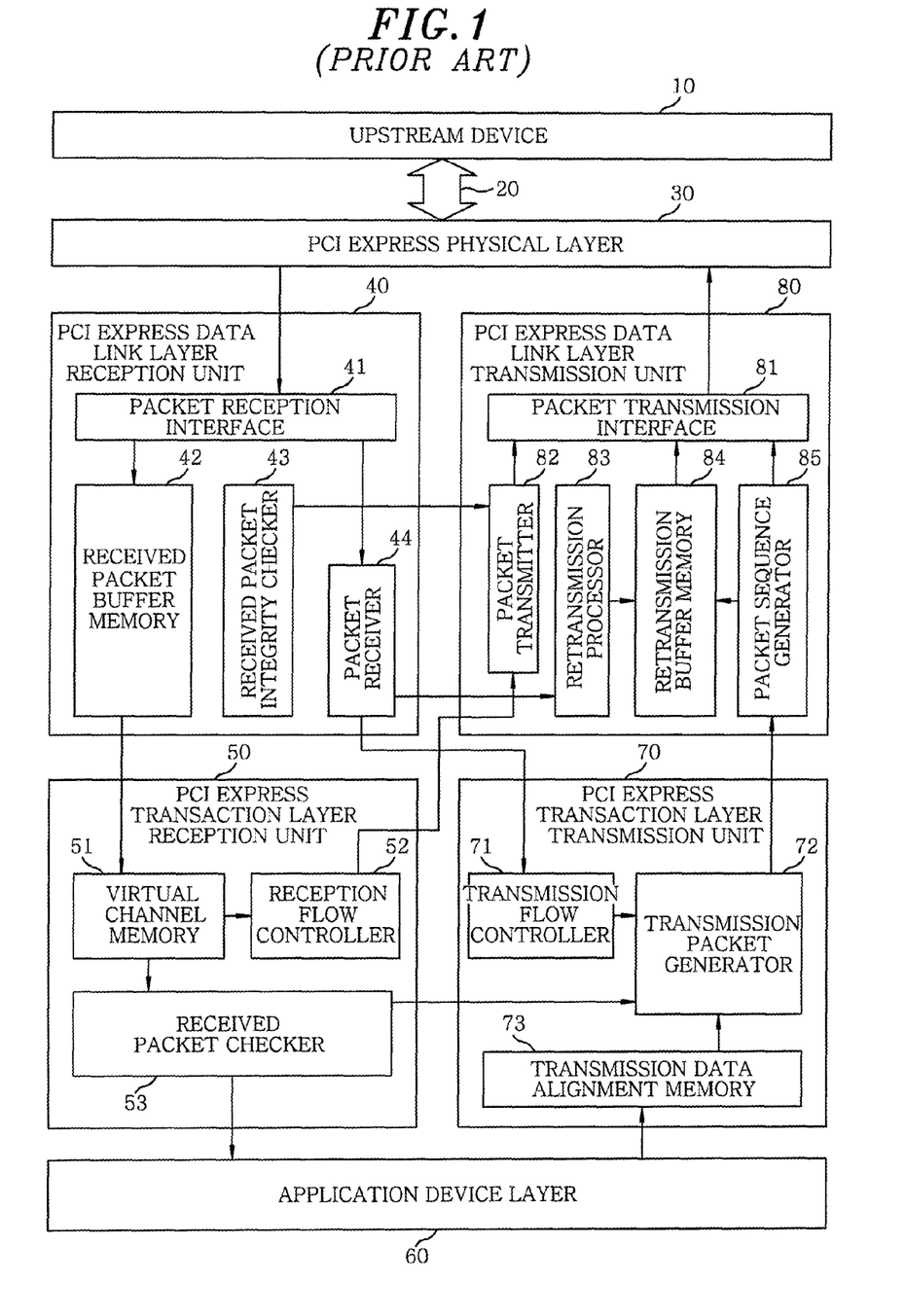
FIG. 1 is a block diagram showing the construction of a conventional apparatus for processing a PCI Express protocol.

FIG. 1 is a block diagram showing the construction of a conventional apparatus for processing a PCI Express protocol. Referring to FIG. 1, a conventional process of processing a PCI Express protocol will be described below.

First, the reception flow controller 52 of a PCI Express transaction layer reception unit 50 periodically detects the size of the storage space of virtual channel memory 51, and transmits information about the size to the packet transmitter 82 of a PCI Express data link layer transmission unit 80. The packet transmitter 82 creates a flow control packet, and transmits the packet to a PCI Express physical layer 30 through a packet transmission interface 81. The PCI Express physical layer 30 attaches frame information to the flow control packet, and transmits the flow control packet with the frame information attached thereto to an upstream device 10 through a PCI Express link 20.

The upstream device 10 checks whether an available packet storage space is present in the virtual channel memory 51 of the PCI Express transaction layer reception unit 50, and creates a request packet if an available packet storage space is present in the virtual channel memory 51. The request packet created by the upstream device 10 reaches the PCI Express physical layer 30 through the PCI Express link 20. The PCI Express physical layer 30 removes the frame information from the packet, and transmits the frame information-free packet to a PCI Express data link layer reception unit 40. The PCI Express data link layer reception unit 40 receives a transaction layer packet TLP, that is, the request packet, through a packet reception interface 41 therein, and temporarily stores the transaction layer packet TLP in received packet buffer memory 42. When the overall packet has been stored, a received packet integrity checker 43 checks the integrity of the packet. If the packet is determined to be complete, the received packet integrity checker 43 transmits an acknowledgement signal indicating that an acknowledgement packet Ack DLLP can be transmitted to a packet transmitter 82 inside the PCI Express data link layer transmission unit 80.

The packet transmitter 82 creates an acknowledgement packet Ack DLLP, and transmits the packet to the PCI Express physical layer 30 through the packet transmission interface 81. The PCI Express physical layer 30 transmits the acknowledgement packet to the upstream device 10 through the PCI Express link 20.

When the integrity of the packet is verified by the received packet integrity checker 43, the packet inside the received packet buffer memory 42 is transmitted to the virtual channel memory 51 at the same that the acknowledgement packet is created and transmitted to the upstream device 10 as described above. A received packet checker 53 checks whether the packet is a packet which can be handled in an application device layer 60. If the packet a packet which can be handled in the application device layer 60, the received packet checker 53 creates the header of an acknowledgement packet, and transmits the header information to a transmission packet generator 72 inside the PCI Express transaction layer transmission unit 70. Furthermore, the received packet checker 53 directs the application device layer 60 to access data. The application device layer 60 stores data access results which were generated at a certain point of time, in transmission data alignment memory 73.

After recognizing the header and data part of response information for the request packet, the received packet checker 53 deletes the packet from the virtual channel memory 51. Since an available packet storage space is generated in the virtual channel memory 51 again after the deletion of the packet, the reception flow controller 52 transmits flow control information to the packet transmitter 82, the packet transmitter 82 creates a flow control packet and transmits the flow control packet to the PCI Express physical layer 30 through the packet transmission interface 81, and the PCI Express physical layer 30 attaches frame information to the flow control packet and transmits the flow control packet with the frame information attached thereto to the upstream device 10 through the PCI Express link 30.

The upstream device 10 receives an acknowledgement packet, creates the information of a flow control packet indicating whether storage can be performed on its own virtual channel memory, and transmits the flow control packet to the PCI Express physical layer 30 through the PCI Express link 20. This is transmitted to a packet receiver 44 through the packet reception interface 41 inside the PCI Express data link layer reception unit 40. The information of the flow control packet received by the packet receiver is transmitted to a transmission flow controller 71 inside the PCI Express transaction layer transmission unit 70, and will be used as information for determining whether an acknowledgement packet can be transmitted later.

When the data transmitted by the application device layer 60 is all stored in the transmission data alignment memory 73 and a signal which is determined to be transmitted by the transmission flow controller 71 transmitted to the transmission packet generator 72, the transmission packet generator 72 combines data stored in the transmission data alignment memory 73 with header information previously received from the received packet checker 53, and transmits resulting data to the packet sequence generator 85 of the PCI Express data link layer transmission unit 80. Furthermore, the packet sequence generator 85 attaches a sequence used for the upstream device 10 to determine the integrity of a transaction layer packet and a Cyclic Redundancy Code (LCRC) on a link to the front and rear ends of the response packet, respectively. The packet made to include the integrity information by the packet sequence generator 85 is transmitted to the PCI Express physical layer 30 through the packet transmission interface 81 and, at the same time, is temporarily stored in retransmission buffer memory 84. If an error occurs in the transmission of the packet and, therefore, the packet needs to be transmitted again, the data temporarily stored in the retransmission buffer memory 84 is transmitted again.

The acknowledgement packet transmitted to the PCI Express physical layer 30 is transmitted to the upstream device 10 through the PCI Express link 20. The upstream device 10 checks the integrity of the received acknowledgement packet, loads information about checking results on an integrity acknowledgement packet Ack/Nak DLLP, and transmits the integrity acknowledgement packet with the information loaded thereon to the PCI Express physical layer 30 through the PCI Express link 20. The PCI Express physical layer 30 removes the frame information from the received acknowledgement packet, and transmits the frame information-free acknowledgement packet to the packet receiver 44 through the packet reception interface 41. If the packet received by the packet receiver 44 is an Ack (Acknowledge) packet, a signal directing the response packet temporarily stored in the retransmission buffer memory 84 of the retransmission processor 83 to be removed. In contrast, if the received packet is a Nak (negative acknowledge) packet, the retransmission processor 83 is directed to retransmit the acknowledgement packet temporarily stored in the retransmission buffer memory 84.

Furthermore, if there has been no Ack or Nak response in the packet receiver 44 for a predetermined period of time, the retransmission processor 83 is directed to transmit the packet temporarily stored in the retransmission buffer memory 84 again. This packet retransmission process is repeated until an Ack packet is received. The PCI Express link 20 is reset every four times.

In order to prepare for the case where in the above process, the request packet created by the upstream device 10 is a packet for reading data in the application device layer 60 and the length of the data is not uniform, the received packet buffer memory 42 needs to have data storage memory having a capacity equal to or greater than 4 Kbyte, that is, the greatest length which was defined in the PCI Express specifications, and the virtual channel memory 51 needs to also have data storage memory having a capacity equal to or greater than 4 Kbyte. In order to prepare for the case where in the above-described process, the request packet created by the upstream device 10 is a packet for reading data in the application device layer 60 and the length of the data is not uniform, the transmission data alignment memory needs to have memory having a capacity equal to or greater than 4 Kbyte so as to store data and the retransmission buffer memory 84 needs to also have memory having a capacity equal to or greater than 4 Kbyte.

In the technology for processing a PCI Express protocol, packets for memory transaction transmission and reception are assumed to be processed in the manner of bust transmission or block unit transmission in the memory transaction transmission and reception, so that the lengths of the packets cannot be predicted, with the result that buffers needs to be used as described above.

However, in the case of a PCI Express device processing only Input/Output (I/O) transactions, an actually used packet includes one data payload, so that the length of the packet cannot be predicted. With regard to the frequency of reception of packets, a counterpart device (master device) which created an input/output transaction creates a subsequent packet after waiting for a response, so that the device does not create packets for which responses have not been received at the same time.

As an example, when a PCI Express device which receives only an input/output transaction is used for the expansion of a 500 Mbps serial port in the PCI Express, a bandwidth equal to or less than ⅕ of the bandwidth (in the case of 1×, 2.5 Gbps) provided by the PCI Express is used, so that the frequency of packets is not high even when the time taken until a packet generated at an actual PCI Express link is received after being transmitted is sufficiently taken into account.

In this case, when the conventional apparatus for processing a PCI Express protocol is used, a large amount of memory is unnecessarily used. In the case where an apparatus for processing a PCI Express protocol (engine) and an application device (engine) are integrated in a single chip, the apparatus for processing a PCI Express protocol occupies unnecessary memory in an actual operation, so that a problem arises in that the amount of memory which needs to be occupied by the application device is relatively reduced. Accordingly, in order to overcome this problem, some other devices may be selected for such integration.

As described above, in the conventional apparatus for processing a PCI Express protocol, even a device which processes predictable transactions needs to use memory in a uniform manner, so that a problem arises in that lack of memory resources may be caused to an application device.

Furthermore, due to different memory interfaces of respective manufacturing processes resulting from the variety of integration processes, methods of operating memory, that is, memory access protocols and operating speeds, are different from one another, so that a problem may occur in that the design of the apparatus for processing a PCI Express protocol needs to bP changed to fit a memory interface.

In an input/output transaction used in a low-speed PCI Express, the amount of data to be processed in a request packet or a reading packet is fixed to 4 bytes, 4 or more—Kbyte memory maintained in the received packet buffer memory and the virtual channel memory 51 used in the conventional apparatus for processing a PCI Express protocol shown in FIG. 1 is not actually required, and 4 or more—Kbyte memory maintained in the transmission data alignment memory 73 is not actually required also. Furthermore, in the case of an input/output transaction, although the upstream device 10 having created a request packet receives an acknowledgement packet, checks the acknowledgement packet for integrity, processes information included in the acknowledgement packet and creates a subsequent request packet, a trouble is not caused to the bandwidth. Moreover, in order to create a subsequent request packet, the request packet is created after the virtual channel memory 51 has been checked for a data storage space. Accordingly, in order to determine whether to retransmit an acknowledgement packet created by the packet sequence generator 85, if the reception flow controller 52 is aware of information about the reception of an acknowledgement packet Ack DLLP transmitted to the retransmission processor 83 by the packet receiver 44, the reception flow controller 52 directs the packet transmitter 82 to transmit a flow control packet, including information indicating that a subsequent request packet can be received, only when an acknowledgement packet generated by the packet sequence generator 85 has completely arrived, so that it is not necessary to use the retransmission buffer memory 84.

SUMMARY OF THE INVENTION

In view of the above, the present invention provides an apparatus for processing a PCI Express protocol which enables the checking of integrity of a received packet, the alignment of the data of a packet to be transmitted or the retransmission of a packet to be transmitted to be implemented without requiring memory.

In accordance with a first aspect of the present invention, there is provided an apparatus for processing a Peripheral Component Interconnect (PCI) Express protocol, including: a PCI Express transaction layer reception unit for transmitting status information indicating that a writing request packet is received to a PCI Express data link layer transmission unit, and performing a data writing operation on an application device layer by performing real-time processing without storing the writing request packet; a PCI Express data link layer transmission unit for creating a flow control packet according to the status information, transmitting the flow control packet to a PCI Express physical layer, and transmitting an integrity acknowledgement packet for the writing request packet to the PCI Express physical layer; a PCI Express physical layer for transmitting the flow control packet and the integrity acknowledgement packet to an upstream device through a PCI Express link, and transmitting the writing request packet, received from the upstream device through the PCI Express link, to a PCI Express data link layer reception unit; and a PCI Express data link layer reception unit for transmitting the writing request packet, received from the PCI Express physical layer, to the PCI Express transaction layer reception unit by performing real-time processing without storing the received writing request packet, and transmitting the integrity acknowledgement packet to the PCI Express data link layer transmission unit and a PCI Express transaction layer reception unit based on results of real-time integrity checking.

In accordance with a second aspect of the present invention, there is provided an apparatus for processing a PCI Express protocol, including: a PCI Express transaction layer reception unit for transmitting status information indicating that a reading request packet can be received to a PCI Express data link layer transmission unit; a PCI Express data link layer transmission unit for creating a flow control packet according to the status information, transmitting the flow control packet to a PCI Express physical layer, and transmitting an integrity acknowledgement packet for the reading request packet to the PCI Express physical layer; a PCI Express physical layer for transmitting the flow control packet and the integrity acknowledgement packet to an upstream device, and transmitting the reading request packet, received from the upstream device, to a PCI Express data link layer reception unit; a PCI Express data link layer reception unit for transmitting the reading request packet, received from the PCI Express physical layer, to the PCI Express transaction layer reception unit by performing real-time processing without storing the received reading request packet, and transmitting the integrity acknowledgement packet to the PCI Express data link layer transmission unit and a PCI Express transaction layer reception unit based on results of real-time integrity checking; and a PCI Express transaction layer transmission unit for creating a reading response packet for the reading request packet based on access data received from the application device layer without alignment, and transmitting the response packet to the PCI Express data link layer transmission unit, thereby allowing the response packet to be transmitted finally to the upstream device.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 2:
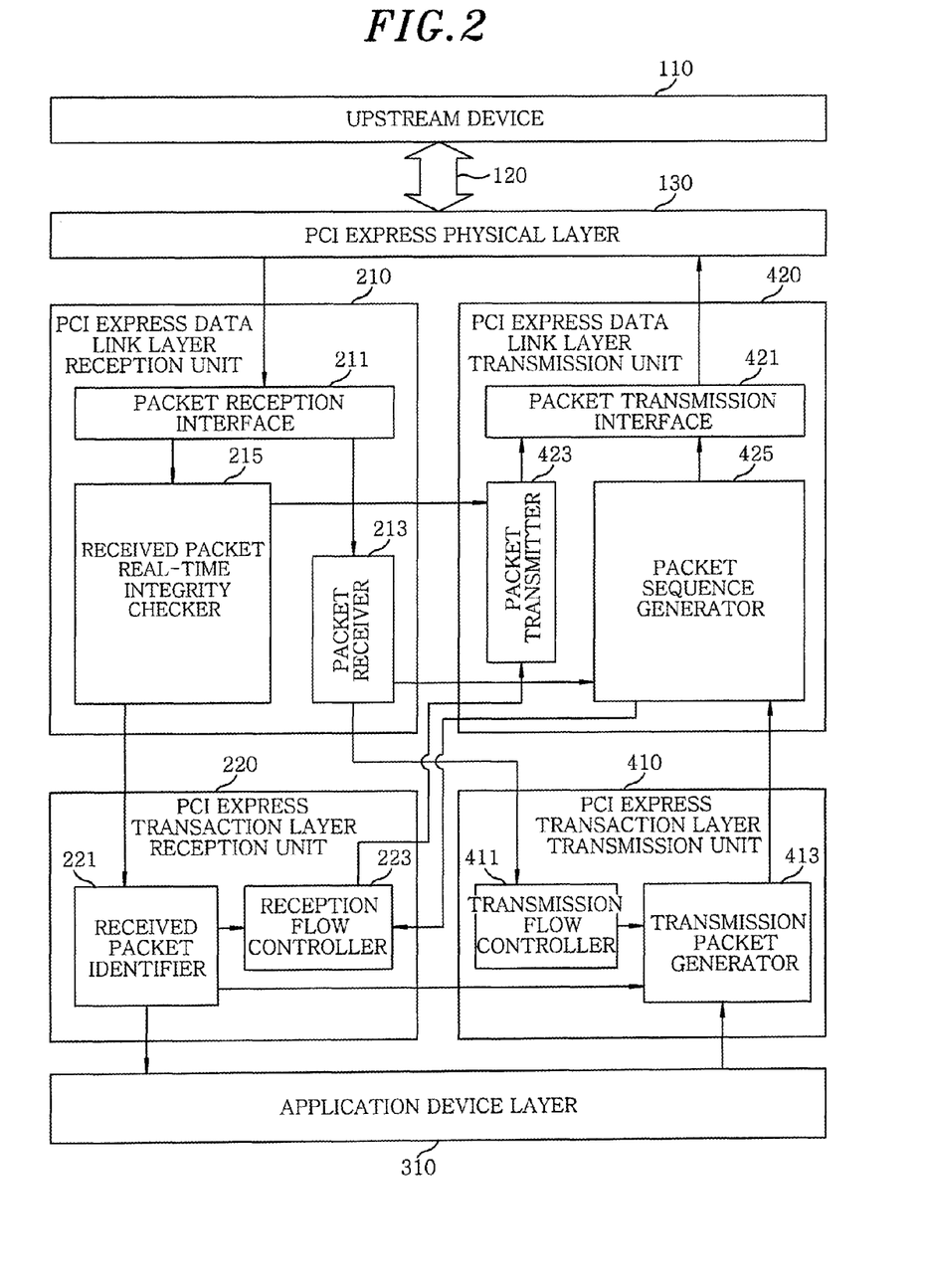
FIG. 2 is a block diagram showing the construction of an apparatus for processing a PCI Express protocol according to an embodiment of the present invention.

FIG. 2 is a block diagram showing the construction of an apparatus for processing a PCI express protocol according to an embodiment of the present invention. The apparatus for processing a PCI Express protocol may be implemented using a protocol processing apparatus dedicated to writing onto an application device layer, a protocol processing apparatus dedicated to reading from the application device layer, or a protocol processing apparatus capable of performing writing and reading on the application device layer. Accordingly, in the following description of elements, a protocol processing apparatus for writing and a protocol processing apparatus for reading will be described.

First, an apparatus for processing a PCI Express protocol, which is capable of supporting writing onto an application device layer, includes a PCI Express transaction layer reception unit 220 for transmitting status information indicating that a writing request packet can be received to a PCI Express data link layer transmission unit 420, and performing a data writing operation on an application device layer 310 by performing real-time processing without storing the writing request packet; the PCI Express data link layer transmission unit 420 for creating a flow control packet according to the status information, transmitting the flow control packet to a PCI Express physical layer 130, and transmitting an integrity acknowledgement packet for the writing request packet to the PCI Express physical layer 130; the PCI Express physical layer 130 for transmitting the flow control packet and the integrity acknowledgement packet to an upstream device 110 through a PCI Express link 120, and transmitting the writing request packet, received from the upstream device 110 through the PCI Express link 120, to a PCI Express data link layer reception unit 210; a PCI Express data link layer reception unit 210 for transmitting the writing request packet, received from the PCI Express physical layer, to the PCI Express transaction layer reception unit 220 by performing real-time processing without storing the received writing request packet, and transmitting the integrity acknowledgement packet to the PCI Express data link layer transmission unit 420 and a PCI Express transaction layer reception unit 410 based on the results of real-time integrity checking; and the PCI Express transaction layer transmission unit 410 for creating a writing response packet for the writing request packet based on whether the writing on the application device layer 310 has been completed, and transmitting the response packet to the PCI Express data link layer transmission unit 420, thereby allowing the response packet to be finally transmitted to the upstream device 110.

Next, an apparatus for processing a PCI Express protocol, which is capable of supporting reading from an application device layer, includes a PCI Express transaction layer reception unit 220 for transmitting status information indicating that a reading request packet can be received to a PCI Express data link layer transmission unit 420; the PCI Express data link layer transmission unit 420 for creating a flow control packet according to the status information, transmitting the flow control packet to a PCI Express physical layer 130, and transmitting an integrity acknowledgement packet for the reading request packet to the PCI Express physical layer 130; the PCI Express physical layer 130 for transmitting the flow control packet and the integrity acknowledgement packet to an upstream device 110, and transmitting the reading request packet, received from the upstream device 110, to a PCI Express data link layer reception unit 210; a PCI Express data link layer reception unit 210 for transmitting the reading request packet, received from the PCI Express physical layer, to the PCI Express transaction layer reception unit 220 by performing real-time processing without storing the received reading request packet, and transmitting the integrity acknowledgement packet to the PCI Express data link layer transmission unit 420 and a PCI Express transaction layer reception unit 410 based on the results of real-time integrity checking; and the PCI Express transaction layer transmission unit 410 for creating a reading response packet for the reading request packet based on access data received from the application device layer 310 without alignment, and transmitting the response packet to the PCI Express data link layer transmission unit 420, thereby allowing the response packet to be finally transmitted to the upstream device 110.

Figure 3:
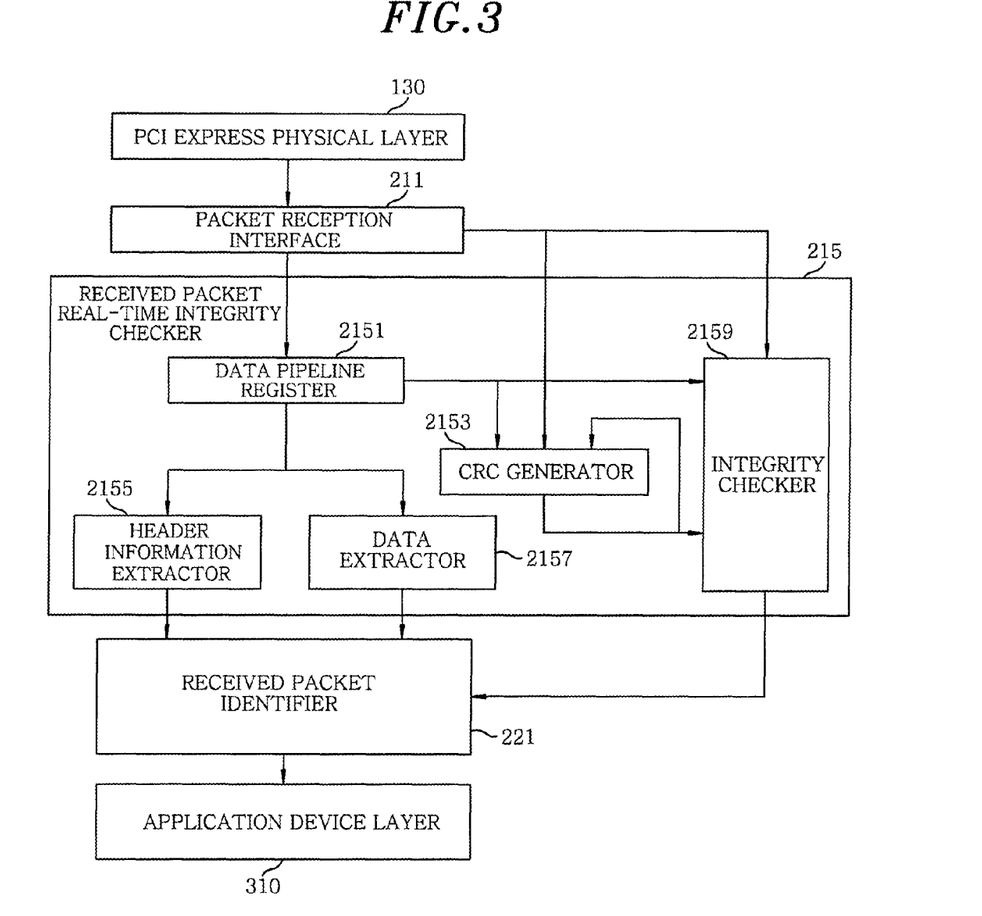
FIG. 3 is a diagram showing the detailed construction of the received packet real-time integrity checker of the apparatus for processing a PCI Express protocol shown in FIG. 2.
Figure 4:
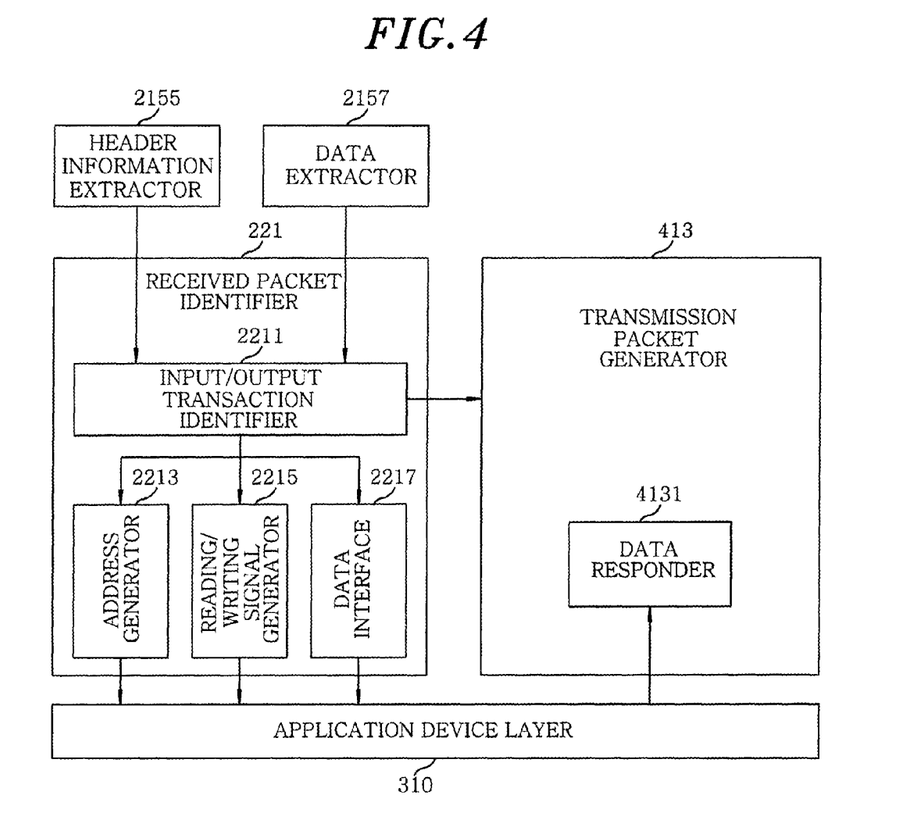
FIG. 4 is a diagram showing the detailed construction of the received packet identifier of the apparatus for processing a PCI Express protocol shown in FIG. 2.
Figure 5:
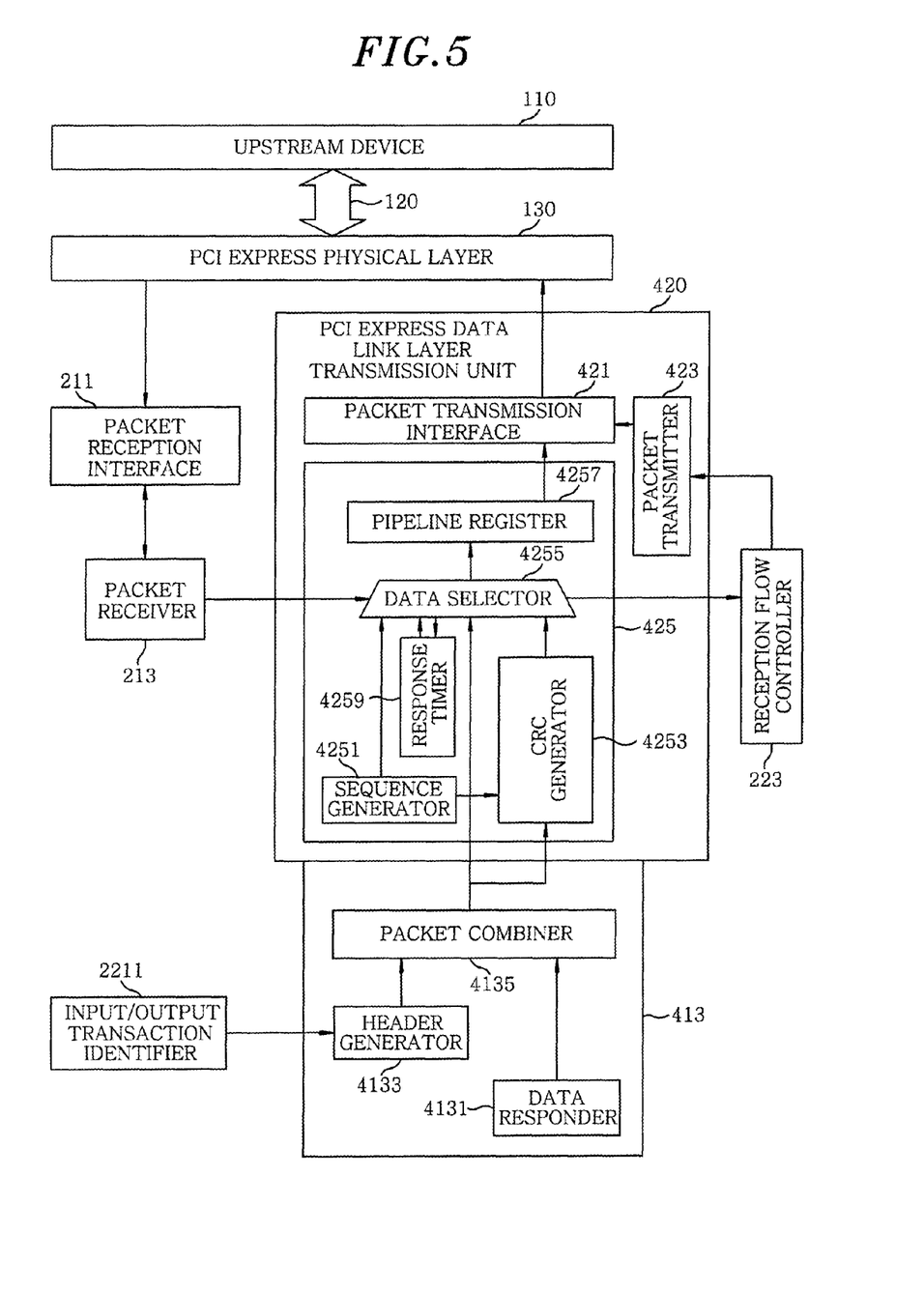
FIG. 5 is a diagram showing the detailed construction of the PCI Express data link layer transmission unit of the apparatus for processing a PCI Express protocol shown in FIG. 2.

FIG. 3 is a diagram showing the detailed construction of the received packet real-time integrity checker 215 of the apparatus for processing a PCI Express protocol shown in FIG. 2, FIG. 4 is a diagram showing the detailed construction of the received packet identifier 221 of the apparatus for processing a PCI Express protocol shown in FIG. 2, and FIG. 5 is a diagram showing the detailed construction of the PCI Express data link layer transmission unit 420 of the apparatus for processing a PCI Express protocol shown in FIG. 2.

Referring to FIGS. 2 to 5, the elements of the apparatus for processing a PCI Express protocol according to an embodiment of the present invention will be described in detail below.

The PCI Express data link layer reception unit 210 includes a packet reception interface 211 for providing an interface with the PCI Express physical layer 130; a received packet real-time integrity checker 215 for performing integrity checking in real time by performing sequence checking and Cyclic Redundancy Code (CRC) checking on the writing request packet or reading request packet received through the packet reception interface 211; and a packet receiver 213 for notifying the PCI Express transaction layer transmission unit 410 of whether the writing response packet or reading response packet can be received by the upstream device 110 based on the content of the flow control packet received through the packet reception interface 211.

The received packet real-time integrity checker 215 includes a data pipeline register 2151 for allowing the content of a transaction layer packet, received from the PCI Express physical layer 130, to be aligned and to be input in real time one in each regular period; a CRC generator 2153 for generating a CRC regarding the content of the transaction layer packet; an information extractor 2155 for separating meaningful content from the header of the transaction layer packet, and temporarily storing the meaningful content; a data extractor 2157 for separating data from the transaction layer packet, and temporarily storing the data; and an integrity checker 2159 for checking the integrity of the content of the header information extractor 2155 and the integrity of the content of the data extractor 2157 by comparing a value output from the CRC generator 2153 with a CRC value input to the data pipeline register 2151.

The PCI Express transaction layer reception unit 220 includes a received packet identifier 221 for checking the error of the writing request packet or reading request packet, and notifying the PCI Express transaction layer transmission unit 410 of the fact that the writing response packet or reading response packet needs to be created and the header information of the writing response packet or reading response packet; and a reception flow controller 223 for transmitting status information about the received packet identifier 221 to the PCI Express data link layer transmission unit 420.

The received packet identifier 221 includes an input/output transaction identifier 2211 for identifying an input/output transaction for the request packet received from the PCI Express data link layer reception unit 210; an address generator 2213 for, when the input/output transaction identifier 2211 identifies the request packet as a writing request packet or reading request packet, creating an address suitable for the application device layer 310, and providing the address to the application device layer 310; a reading/writing signal generator 2215 for generating a writing signal when the input/output transaction identifier 2211 identifies the request packet as a writing request packet or reading signal when the input/output transaction identifier 2211 identifies the request packet as a reading request packet, and providing the writing or reading signal to the application device layer 310; and a data interface 2217 for, when the input/output transaction identifier 2211 identifies the request packet as a writing request packet, providing the data of the writing request packet to the application device layer 310.

The input/output transaction identifier 2211 transmits the header information of the response packet, received from the PCI Express data link layer reception unit 220, to the PCI Express transaction layer transmission unit 410, and the PCI Express transaction layer transmission unit 410 includes a data responder 4131 for, after a writing or reading operation of the application device layer 310 has been completed, creating the writing response packet or reading response packet using the header information previously received through the input/output transaction identifier 2211.

The PCI Express transaction layer transmission unit 420 includes a transmission flow controller 411 for determining whether the writing response packet or reading response packet can be received by the upstream device 110 based on the content of the flow control packet arriving at the PCI Express data link layer reception unit 210, and determining whether to transmit the writing response packet or reading response packet; and a transmission packet generator 413 for, when the transmission flow controller 411 determines to transmit the writing response packet or reading response packet, creating the writing response packet or reading response packet by combining the previously received header information with information about the completion of a writing operation or the completion of a reading operation received in real time from the application device layer, and transmitting the writing response packet or reading response packet to the PCI Express data link layer transmission unit 420.

The PCI Express data link layer transmission unit 420 includes a packet transmission interface 421 for providing an interface with the PCI Express physical layer 130; a packet transmitter 423 for creating the flow control packet using the status information received from the PCI Express transaction layer reception unit 220, and transmitting the flow control packet to the PCI Express physical layer 130 through the packet transmission interface 421; and a packet sequence generator 425 for transmitting the integrity acknowledgement packet for the writing or reading request packet to the PCI Express physical layer 130 through the packet transmission interface 421, or creating a sequence and a CRC for the writing or reading response packet and transmitting the sequence and the CRC to the PCI Express physical layer 130 through the packet transmission interface 421.

The packet sequence generator 425 includes a sequence generator 4251 for creating sequence information for a transaction layer packet received from the PCI Express transaction layer transmission unit 410; a CRC generator 4253 for creating a CRC based on the content of the transaction layer packet and the sequence information; a data selector 4255 for dividing the response packet by a predetermined bit unit in order of output of the sequence generator 4251, output of the packet combiner 4135, and output of the CRC generator 4253; and a pipeline register 4257 for temporarily storing the response packet divided by the data selector 4255, and outputting the divided response packet to the packet transmission interface 421. The data selector 4255 operates a response timer 4259 when transmitting the response packet, and performs retransmission based on the timeout information of the response timer 4259 if the integrity acknowledgement packet for the response packet has not been received for a predetermined period.

Referring to FIG. 2, a process of processing a PCI Express protocol according to an embodiment of the present invention will be described below.

In FIG. 2, a process of performing writing on the application device layer 310 will be described as follows. Since FIG. 2 does not include the received packet buffer memory and received packet checker of FIG. 1, the received packet identifier 221 is limited only to the processing of one writing request packet.

First, the reception flow controller 223 of the PCI Express transaction layer reception unit 220 transmits information about the fact that one writing request packet can be received to the packet transmitter 423 inside the PCI Express data link layer transmission unit 420, and the packet transmitter 423 creates a flow control packet Flow Control DLLP using the information received from the reception flow controller 223 and transmits the flow control packet to the PCI Express physical layer 130 through the packet transmission interface 421.

The PCI Express physical layer 130 attaches frame information to the flow control packet and transmits the flow control packet with the frame information attached thereto to the upstream device 110 through the PCI Express link 120, and the upstream device 110 creates one writing request packet. After creating the writing request packet, the upstream device 110 cannot create a writing request packet until a flow control packet, including information indicating that one writing request packet can be received again, is received.

The writing request packet created by the upstream device 110 arrives at the PCI Express physical layer 130 through the PCI Express link 120, and the arriving packet is deprived of a frame and arrives at the received packet real-time integrity checker 215 through the packet reception interface 211. The received packet real-time integrity checker 215 performs sequence checking and CRC checking while transmitting the packet to the received packet identifier 221 without storing the packet. If the sequence and CRC of the transmitted packet are correct, this information is transmitted to the packet transmitter 423, so that an acknowledgement packet Ack DLLP is created. If the sequence and CRC of the transmitted packet are not correct, this information is transmitted to the packet transmitter 423, so that a negative acknowledgement packet Nak DLLP is created. At the same time, the received packet identifier 221 is notified of information about the fact that the packet is incomplete, so that the received packet identifier 221 treats the packet as an erroneous packet.

Since the amount of data is limited to 32 bits because FIG. 2 considers only input/output transactions, a packet of a size larger than 32 bits is examined by the received packet real-time integrity checker 215, and the remaining input data is discarded and, at the same time, the received packet identifier 221 is notified of the fact that the transmitted packet has an error.

If the writing request packet has no error, the received packet identifier 221 notifies the transmission packet generator 413 of the fact that a writing response packet needs to be created and of the header information of the writing response packet, and performs an operation of write data on the application device layer 310. After the writing operation has been completed, the application device layer 310 notifies the transmission packet generator 413 of the information.

The transmission flow controller 411 notifies the transmission packet generator 413 of whether the upstream device 110 can receive the writing response packet, notification of which was provided by the packet receiver 213, based on the content of the flow control packet arriving from the upstream device 110 through the PCI Express link 120, the PCI Express physical layer 130 and the packet reception interface 211 to the packet receiver 213.

When the transmission flow controller 411 transmits information indicating that the writing response packet may be transmitted, the transmission packet generator 413 creates a writing response packet for the writing request packet by combining the header information of the writing response packet previously received from the received packet identifier 221 with information about the completion of the writing operation received from the application device layer 310, and transmits the writing response packet to the packet sequence generator 425 inside the PCI Express data link layer transmission unit 420. The packet sequence generator 425 creates a sequence and a CRC for the writing response packet received from the transmission packet generator 413 and transmits the sequence and the CRC to the PCI Express physical layer 130 through the packet transmission interface 421, and the PCI Express physical layer 130 attaches frame information to the packet and transmits the packet to the upstream device 110 through the PCI Express link 120.

The upstream device 110 creates an integrity acknowledgement packet Ack/Nak DLLP for the received writing response packet and transmits the integrity acknowledgement packet Ack/Nak DLLP to the PCI Express physical layer 130 through the PCI Express link 120. The integrity acknowledgement packet Ack/Nak DLLP arriving at the PCI Express physical layer 130 arrives at the packet receiver 213 through the packet reception interface 211. Information about the arrival of the integrity acknowledgement packet Ack/Nak DLLP is provided to the packet sequence generator 425. If the negative acknowledgement packet Nak DLLP has been received or the integrity acknowledgement packet Ack/Nak DLLP has not been received for a predetermined period, the packet sequence generator 425 performs retransmission based on the previously transmitted transaction layer packet TLP information because the packet sequence generator 425 still has the information. This is repeated until information indicating that the Ack acknowledgement packet Ack DLLP has been received is received.

When the packet sequence generator 425 becomes aware of the information about the arrival of the acknowledgement packet Ack DLLP, the packet sequence generator 425 notifies the reception flow controller 223 of the information. Since the reception flow controller 223 becomes aware of the fact that the transmitted writing response packet completely arrives at the upstream device 110 in the above process, the reception flow controller 223 can receive a subsequent writing request packet, and notifies the packet transmitter 423 of the fact that one writing request packet can be received again. The packet transmitter 423 creates a flow control packet including information indicating that one writing request packet can be received again, and transmits the flow control packet to the PCI Express physical layer 130 through the packet transmission interface 421. The PCI Express physical layer 130 attaches frame information to the flow control packet, and transmits the flow control packet with the frame information attached thereto to the upstream device 110 through the PCI Express link 120. The upstream device 110 having received the flow control packet including information indicating that one writing request packet can be received again can create a subsequent writing request packet.

Referring to FIG. 2, a process of performing reading from the application device layer 310 will be described below. Since FIG. 2 does not include the received packet buffer memory and received packet checker of FIG. 1, the received packet identifier 221 is limited only to the processing of one reading request packet. Accordingly, the reception flow controller 223 transmits the information indicating that one reading request packet can be received to a packet transmitter 423 inside the PCI Express data link layer transmission unit 420. The packet transmitter 423 creates a flow control packet Flow Control DLLP using the information, and transmits the flow control packet to the PCI Express physical layer 130 through the packet transmission interface 421. The PCI Express physical layer 130 attaches frame information to the flow control packet and transmits the flow control packet with the frame information attached thereto to the upstream device 110 through the PCI Express link 120, and the upstream device 110 creates one reading request packet. After the upstream device 110 has created the reading request packet, the upstream device 110 cannot create a reading request packet until the upstream device 110 receives a flow control packet including information indicating that one reading request packet cannot be received again.

The reading request packet created by the upstream device 110 arrives at the PCI Express physical layer 130 through the PCI Express link 120. The arriving packet is deprived of the frame, and arrives at the received packet real-time integrity checker 215 through the packet reception interface 211. The received packet real-time integrity checker 215 performs sequence checking and CRC checking while transmitting the packet to the received packet identifier 221 without storing the packet. If the sequence and CRC of the transmitted packet are correct, this information is transmitted to the packet transmitter 423, so that an acknowledgement packet Ack DLLP can be created. If they are incorrect, this information is transmitted to the packet transmitter 423, so that a negative acknowledgement packet Nak DLLP can be created. At the same time, the received packet identifier 221 is notified of the information indicating that the packet is incorrect, so that the received packet identifier 221 treats the packet as an erroneous packet. In the case of a reading packet, a transaction is composed only of a header, so that memory for storing additional data is not required.

When the reading request packet has no error, the received packet identifier 221 notifies the transmission packet generator 413 of the fact that a reading response packet needs to be created and the header information of the response packet, and a data reading operation is performed in the application device layer 310. The application device layer 310 hands over read data (assessed data) to the transmission packet generator 413 after the completion of a reading operation. In the present invention, only input/output transactions are processed, so that the amount of data read from the reading request packet is limited to 32 bits. Accordingly, a reading request packet greater than bits is determined to be an erroneous packet and is discarded by the received packet identifier 221, and the transmission packet generator 413 may have only the path of 32-bit data.

The transmission flow controller 411 notifies the transmission packet generator 413 of the information about whether the upstream device 110 can receive a reading response packet, provided by the packet receiver 213, based on the content of the flow control packet arriving from the upstream device 110 through the PCI Express link 120, the PCI Express physical layer 130 and the packet reception interface 211 to the packet receiver 213.

If the transmission flow controller 411 transmits information indicating that a reading response packet can be transmitted, the transmission packet generator 413 creates a reading response packet for the reading request packet by combining the header information of the reading response packet previously received from the received packet identifier 221 with the read data (assessed data) transmitted by the application device layer 310, and transmits the reading response packet to the packet sequence generator 425 inside the PCI Express data link layer transmission unit 420. The packet sequence generator 425 creates a sequence and a CRC for the reading response packet received from the transmission packet generator 413, and transmits the sequence and the CRC to the PCI Express physical layer 130 through the packet transmission interface 421. The PCI Express physical layer 130 attaches frame information to the packet, and transmits the packet with the frame information attached thereto to the upstream device 110 through the PCI Express link 120.

The upstream device 110 creates an integrity acknowledgement packet Ack/Nak DLLP for the received reading response packet, and transmits the integrity acknowledgement packet Ack/Nak DLLP to the PCI Express physical layer 130 through the PCI Express link 120. The integrity acknowledgement packet Ack/Nak DLLP arriving at the PCI Express physical layer 130 arrives at the packet receiver 213 through the packet reception interface 211. Information about the arrival of the integrity acknowledgement packet Ack/Nak DLLP is provided by the packet sequence generator 425. If a negative acknowledgement packet Nak DLLP has been received or an integrity acknowledgement packet Ack/Nak DLLP has not been received for a predetermined period, the packet sequence generator 425 performs retransmission based on transaction link packet (TLP) information because the packet sequence generator 425 has the information. This is repeated until information about the arrival of the acknowledgement packet Ack DLLP is received.

When the packet sequence generator 425 becomes aware of the arrival of the acknowledgement packet Ack DLLP, the packet sequence generator 425 notifies the reception flow controller 223 of the information. Since the reception flow controller 223 becomes aware that the transmitted reading response packet has completely arrived at the upstream device 110 through the above process, the reception flow controller 223 can receive a subsequent reading request packet and notifies the packet transmitter 423 of the fact that one reading request packet can be received again. The packet transmitter 423 creates a flow control packet including information indicating that one reading request packet can be received again, and transmits the flow control packet to the PCI Express physical layer 130 through the packet transmission interface 421. The PCI Express physical layer 130 attaches frame information to the flow control packet, and transmits the flow control packet with the frame information attached thereto to the upstream device 110 through the PCI Express link 120. The upstream device 110 having received the flow control packet including information indicating that one reading request packet can be received again can create a subsequent reading request packet.

FIG. 3 shows the internal structure of a received packet real-time integrity checker 215.

The transaction layer packet TLP received from the PCI Express physical layer 130 is aligned in 32-bit units in the packet reception interface 211, and the content of the packet aligned in 32-bit units is transmitted to the data pipeline register 2151 in a uniform period in real time one piece in each period. The packet reception interface 211 notifies the integrity checker 2159 of information about the start and end of the packet, so that the integrity checker 2159 determines whether the content of the packet present in a 32-bit data temporary storage register is initial sequence information, intermediate transaction layer packet (TLP) content, or a final CRC. The content stored in the data pipeline register 2151 is input to the CRC generator 2153 of input, and thus a CRC for the content of the packet divided into 32-bit units is created. In order to create a 32-bit CRC, two values are required. The 32-bit CRC is created using the output value of the CRC generator 2153 and the value received from the data pipeline register 2151. In the case of the start of a packet, the packet reception interface 211 notifies the CRC generator 2153 of information about the start of the packet. When a CRC for the start of the packet is created, the initial output of the CRC generator 2153 is created using a value with 32 individual bits set to '1' instead of the previously stored output value of the CRC generator 2153 in the creation of an initial CRC.

With regard to the content of the 32-bit packet data input to the data pipeline register 2151 in real time, the header information extractor 2155 separates meaningful content from a header and temporarily stores it, and the data extractor 2157 separates and temporarily stores only data. When the last CRC of the packet is input to the data pipeline register 2151, the integrity checker 2159 compares the calculated output value of the CRC generator 2153 with the CRC value input to the data pipeline register 2151, and notifies the received packet identifier 640 of information about the integrity of the content stored in the header information extractor 2155 and information about the integrity of the content stored in the data extractor 2157. Only when packet data is determined to have no defect, the received packet identifier 640 performs a reading or writing operation in the application device layer 310. If a defect is found in a packet, the received packet identifier 640 disregards the content of the header information extractor 2155 and the content of the data extractor 2157 which is being input. Since the received packet real-time integrity checker 215 continuously receives data in 32-bit units in a pipeline manner but does not perform an operation of waiting for the complete arrival of a packet, the received packet real-time integrity checker 215 does not use memory for storing a packet therein. Accordingly, the present invention does not require the received packet buffer memory 420 shown in FIG. 1. Furthermore, since the received packet identifier 640 does not store a packet, the received packet identifier 640 does not use the virtual channel memory 610 shown in FIG. 1. As a result, the PCI Express data link layer reception unit 400 and the PCI Express transaction layer reception unit 600 do not use memory devices at all.

FIG. 4 is a diagram showing an interface with the application device layer 310. When a request packet present in the header information extractor 2155 and the data extractor 2157 is an input/output transaction, the request packet is transmitted to the address generator 2213, the reading/writing signal generator 2215 and the data interface 2217 through the input/output transaction identifier 2211. Furthermore, the header information of the response packet is transmitted to the transmission packet generator 413. If a request packet is a writing request packet, the address generator 2213 creates an address suitable for the application device layer 310, the reading/writing signal generator 2215 creates a writing signal, and data input through the data interface 2217 is transmitted to the application device layer 310. The application device layer 310 notifies the data responder 4131 of the completion of a writing operation. When the writing operation is competed, the transmission packet generator 413 creates a writing response packet using the header information previously received through the input/output transaction identifier 2211. If a request packet is a reading request packet, the address generator 2213 creates an address suitable for the application device layer 310, the reading/writing signal generator 2215 creates a reading signal, and the application device layer 310 transmits read data (assessed data) to the data responder 4131. The transmission packet generator 413 creates a reading response packet by combining the header information of the response packet previously received from the input/output transaction identifier 2211 with data present in the data responder 4131. The number of packets to be processed in the application device layer 310 is one for a reading/writing request packet and, in the case of an input/output transaction, the amount of data to be processed is limited to 32 bits. Accordingly, if the width of data related to a response packet provided from the application device layer 310 to the data responder 4131 is equal to or less than 32 bits, he transmission packet generator 413 does not require the transmission data alignment memory of FIG. 1 in order to store the data of a response packet for a request packet, so that there is no part of the PCI Express transaction layer transmission unit 410 which uses a memory device.

FIG. 5 shows a structure which does not require separate memory for retransmission because content to be used to create a response packet is maintained until the response packet for a request packet is created and the response packet is completely transmitted.

A header generator 4133 creates a header using information for the creation of a header received from the input/output transaction identifier 2211, a data part is created using the output value of the data responder 4131, these two pieces of information are transmitted to the packet combiner 4135, and the packet combiner 4135 creates a complete transaction layer packet TLP. The sequence generator 4251 creates sequence information, and the CRC generator 4253 creates a CRC based on the content of the sequence generator 4251 and the packet combiner 4135. The data selector 4255 divides the response packet into 32-bit units in the sequence of the output of the sequence generator 4251, the output of the packet combiner 4135 and the output of the CRC generator 4253, and outputs division results to the 32-bit pipeline register 4257.

The output value of the pipeline register 4257 arrives at the PCI Express physical layer 130 through the packet transmission interface 421. The PCI Express physical layer 130 attaches frame information to the front and end of the response packet and transmits the response packet with the frame information attached thereto to the upstream device 110 through the PCI Express link 120. The upstream device 110 creates an acknowledgement packet Nak DLLP or a negative acknowledgement packet Nak DLLP for the received response packet and transmits the acknowledgement packet Nak DLLP or negative acknowledgement packet Nak DLLP to the PCI Express physical layer 130 through the PCI Express link 120. The PCI Express physical layer 130 transmits the received acknowledgement packet Nck DLLP or negative acknowledgement packet Nak DLLP to the packet receiver 213 through the packet reception interface 211. The packet receiver 213 determines whether a response to the response packet is an Ack or a Nak, and notifies the data selector 4255 of determination results. If the response is a Nak, the data selector 4255 retransmits a previously transmitted response packet to the pipeline register 4257. Additionally, the data selector 4255 starts the response timer 4259 when the response packet is transmitted first, and performs retransmission based on the time-out information of the response timer 4259 even when an Ack or a Nak has not been received for a predetermined period at all. When the packet received from the packet receiver 213 is an Ack, the data selector 4255 notifies the reception flow controller 223 of the complete transmission of the response packet, and the reception flow controller 223 directs the packet transmitter 423 to create a flow control packet. The packet transmitter 423 creates a flow control packet and transmits the flow control packet to the PCI Express physical layer 130 through the packet transmission interface 421, and the PCI Express physical layer 130 attaches frame information to the flow control packet and transmits the flow control packet with the frame information attached thereto to the upstream device 110 through the PCI Express link 120, so that the upstream device 110 can create a request packet again. Since the information of the packet combiner 4135 indicating the content of the response packet is continuously maintained before the creation of a subsequent request packet, the PCI Express data link layer transmission unit 420 can perform retransmission and guarantee the complete arrival of a response packet without using the retransmission buffer memory of FIG. 1.

In accordance with an embodiment of the present invention, the checking of integrity of a received packet, the alignment of the data of a packet to be transmitted or the retransmission of a transmitted packet is implemented without using memory, thereby overcoming the problems of the conventional technology which can occur due to the use of memory.

Further, the optimized use of resources for an application device chiefly using an input/output transaction can be ensured and the use of the design, without changing the design in the integration of apparatuses for processing a PCI Express protocol in various processes, can be ensured.

While the invention has been shown and described with respect to the embodiments, it will be understood by those skilled in the art that various changes and modifications may be made without departing from the scope of the invention as defined in the following claims.

What is claimed is:

1. An apparatus for processing a Peripheral Component Interconnect (PCI) Express protocol, comprising:
   a PCI Express transaction layer reception unit for transmitting status information indicating that a writing request packet is received to a PCI Express data link layer transmission unit, and performing a data writing operation on an application device layer by performing real-time processing without storing the writing request packet;
   a PCI Express data link layer transmission unit for creating a flow control packet according to the status information, transmitting the flow control packet to a PCI Express physical layer, and transmitting an integrity acknowledgement packet for the writing request packet to the PCI Express physical layer;
   a PCI Express physical layer for transmitting the flow control packet and the integrity acknowledgement packet to an upstream device through a PCI Express link, and transmitting the writing request packet, received from the upstream device through the PCI Express link, to a PCI Express data link layer reception unit; and
   a PCI Express data link layer reception unit for transmitting the writing request packet, received from the PCI Express physical layer, to the PCI Express transaction layer reception unit by performing real-time processing without storing the received writing request packet, and transmitting the integrity acknowledgement packet to the PCI Express data link layer transmission unit and a PCI Express transaction layer reception unit based on results of real-time integrity checking.

2. The apparatus of claim 1, further comprising the PCI Express transaction layer transmission unit for creating a writing response packet for the writing request packet based on whether the writing on the application device layer 310 has been completed, and transmitting the response packet to the PCI Express data link layer transmission unit, thereby allowing the response packet to be finally transmitted to the upstream device.

3. The apparatus of claim 2, wherein the PCI Express data link layer transmission unit performs retransmission based on the previously transmitted transaction layer packet information if a negative acknowledgement packet has been received or an integrity acknowledgement packet for the writing response packet has not been received for a predetermined period.

4. The apparatus of claim 2, wherein the PCI Express transaction layer reception unit holds content of the previous packet for retransmission, and transmits status information indicating that a new writing request packet can be received to the PCI Express data link layer transmission unit when the PCI Express data link layer transmission unit provides notification of arrival of an acknowledgement packet as an integrity acknowledgement packet for the writing response packet.

5. The apparatus of claim 2, wherein the PCI Express data link layer reception unit comprises:
   a packet reception interface for providing an interface with the PCI Express physical layer;
   a received packet real-time integrity checker for performing sequence checking and CRC checking on the writing request packet by performing real-time integrity checking without storing the writing request packet received through the packet reception interface; and
   a packet receiver for notifying the PCI Express transaction layer transmission unit of whether the writing response packet can be received by the upstream device based on content of the flow control packet received through the packet reception interface.

6. The apparatus of claim 5, wherein the received packet real-time integrity checker comprises:

a data pipeline register for allowing content of a transaction layer packet, received from the PCI Express physical layer, to be aligned and to be input in real time one in each regular period;

a CRC generator for generating a CRC regarding the content of the transaction layer packet;

an information extractor for separating meaningful content from a header of the transaction layer packet, and temporarily storing the meaningful content;

a data extractor for separating data from the transaction layer packet, and temporarily storing the data; and an integrity checker for checking integrity of the content of the header information extractor and integrity of the content of the data extractor by comparing a value output from the CRC generator with a CRC value input to the data pipeline register.

7. The apparatus of claim 2, wherein the PCI Express transaction layer reception unit comprises;

a received packet identifier 221 for notifying the PCI Express transaction layer transmission unit of the fact that the writing response packet be created and header information of the writing response packet based on results of checking the writing request packet for errors, which are obtained by performing real-time processing without storing the writing request packet; and a reception flow controller for transmitting status information about the received packet identifier to the PCI Express data link layer transmission unit.

8. The apparatus of claim 7, wherein the received packet identifier comprises;

an input/output transaction identifier for identifying an input/output transaction for the request packet received from the PCI Express data link layer reception unit by performing real-time processing without storing the request packet;

an address generator for, when the input/output transaction identifier identifies the request packet as the writing request packet, creating an address suitable for the application device layer, and providing the address to the application device layer;

a reading/writing signal generator for, when the input/output transaction identifier identifies the request packet as the writing request packet, generating a writing signal, and providing the writing signal to the application device layer; and a data interface for, when the input/output transaction identifier identifies the request packet as the writing request packet, providing data of the writing request packet to the application device layer.

9. The apparatus of claim 8, wherein:

the input/output transaction identifier transmits the header information of the response packet, received from the PCI Express data link layer reception unit, to the PCI Express transaction layer transmission unit; and the PCI Express transaction layer transmission unit comprises a data responder for, after a writing or reading operation of the application device layer has been completed, creating the writing response packet using the header information previously received through the input/output transaction identifier.

10. The apparatus of claim 7 wherein the PCI Express transaction layer transmission unit comprises:

a transmission flow controller for determining whether the writing response packet can be received by the upstream device based on content of the flow control packet arriving at the PCI Express data link layer reception unit, and determining whether to transmit the writing response packet; and a transmission packet generator for, when the transmission flow controller determines to transmit the writing response packet, creating the writing response packet by combining the previously received header information with information about completion of a writing operation received in real time from the application device layer, and transmitting the writing response packet to the PCI Express data link layer transmission unit.

11. The apparatus of claim 7, wherein the PCI Express data link layer transmission unit comprises:

a packet transmission interface for providing an interface with the PCI Express physical layer;

a packet transmitter for creating the flow control packet using the status information received from the PCI Express transaction layer reception unit, and transmitting the flow control packet to the PCI Express physical layer through the packet transmission interface; and a packet sequence generator for transmitting the integrity acknowledgement packet for the writing request packet to the PCI Express physical layer through the packet transmission interface, or creating a sequence and a CRC for the writing response packet and transmitting the sequence and the CRC to the PCI Express physical layer through the packet transmission interface.

12. An apparatus for processing a PCI Express protocol, comprising:

a PCI Express transaction layer reception unit for transmitting status information indicating that a reading request packet can be received to a PCI Express data link layer transmission unit;

a PCI Express data link layer transmission unit for creating a flow control packet according to the status information, transmitting the flow control packet to a PCI Express physical layer, and transmitting an integrity acknowledgement packet for the reading request packet to the PCI Express physical layer;

a PCI Express physical layer for transmitting the flow control packet and the integrity acknowledgement packet to an upstream device, and transmitting the reading request packet, received from the upstream device, to a PCI Express data link layer reception unit;

a PCI Express data link layer reception unit for transmitting the reading request packet, received from the PCI Express physical layer, to the PCI Express transaction layer reception unit by performing real-time processing without storing the received reading request packet, and transmitting the integrity acknowledgement packet to the PCI Express data link layer transmission unit and a PCI Express transaction layer reception unit based on results of real-time integrity checking; and a PCI Express transaction layer transmission unit for creating a reading response packet for the reading request packet based on access data received from the application device layer without alignment, and transmitting the response packet to the PCI Express data link layer transmission unit, thereby allowing the response packet to be transmitted finally to the upstream device.

13. The apparatus of claim 12, wherein the PCI Express data link layer transmission unit performs retransmission based on the previously transmitted transaction layer packet information if a negative acknowledgement packet has been received or an integrity acknowledgement packet for the reading response packet has not been received for a predetermined period.

14. The apparatus of claim 12, wherein the PCI Express transaction layer reception unit holds content of the previous packet for retransmission, and transmits status information indicating that a new reading request packet can be received to the PCI Express data link layer transmission unit when the PCI Express data link layer transmission unit provides notification of arrival of an acknowledgement packet as an integrity acknowledgement packet for the reading response packet.

15. The apparatus of claim 12, wherein the PCI Express data link layer reception unit comprises:
   a packet reception interface for providing an interface with the PCI Express physical layer;
   a received packet real-time integrity checker for performing sequence checking and CRC checking on the reading request packet by performing real-time integrity checking without storing the reading request packet received through the packet reception interface; and
   a packet receiver for notifying the PCI Express transaction layer transmission unit of whether the reading response packet can be received by the upstream device based on content of the flow control packet received through the packet reception interface.

16. The apparatus of claim 12, wherein the PCI Express transaction layer reception unit comprises:
   a received packet identifier for notifying the PCI Express transaction layer transmission unit of the fact that the reading response packet be created and header information of the reading response packet based on results of checking the reading request packet for errors, which are obtained by performing real-time processing without storing the reading request packet; and
   a reception flow controller for transmitting status information about the received packet identifier to the PCI Express data link layer transmission unit.

17. The apparatus of claim 16, wherein the PCI Express transaction layer transmission unit comprises:
   a transmission flow controller for determining whether the reading response packet can be received by the upstream device based on content of the flow control packet arriving at the PCI Express data link layer reception unit, and then determining whether to transmit the reading response packet; and
   a transmission packet generator for, when the transmission flow controller has determined to transmit the reading response packet, creating the reading response packet by combining the previously received header information with the access data received from the application device layer without alignment, and transmitting the reading response packet to the PCI Express data link layer transmission unit.

18. The apparatus of claim 12, wherein the PCI Express data link layer transmission unit comprises:
   a packet transmission interface for providing an interface with the PCI Express physical layer;
   a packet transmitter for creating the flow control packet using the status information received from the PCI Express transaction layer reception unit, and transmitting the flow control packet to the PCI Express physical layer through the packet transmission interface; and
   a packet sequence generator for transmitting the integrity acknowledgement packet for the reading request packet to the PCI Express physical layer through the packet transmission interface, or creating a sequence and a CRC for the reading response packet and transmitting the sequence and the CRC to the PCI Express physical layer through the packet transmission interface.

19. The apparatus of claim 18, wherein the packet sequence generator comprises:
   a sequence generator for creating sequence information for a transaction layer packet received from the PCI Express transaction layer transmission unit;
   a CRC generator for creating a CRC based on the content of the transaction layer packet and the sequence information;
   a data selector for dividing the response packet by a predetermined bit unit in order of output of the sequence generator, output of the packet combiner, and output of the CRC generator; and
   a pipeline register for temporarily storing the response packet divided by the data selector, and outputting the divided response packet to the packet transmission interface.

20. The apparatus of claim 19, wherein the data selector starts a response timer when transmitting the response packet, and performs retransmission based on the timeout information of the response timer if the integrity acknowledgement packet for the response packet has not been received for a predetermined period.

* * * * *